(12) United States Patent
Sato et al.

(10) Patent No.: US 8,005,898 B2
(45) Date of Patent: Aug. 23, 2011

(54) SCREEN SHARING SYSTEM AND DATA TRANSFER METHOD

(75) Inventors: Noriaki Sato, Kawasaki (JP); Koji Yoshida, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 300 days.

(21) Appl. No.: 12/271,286

(22) Filed: Nov. 14, 2008

(65) Prior Publication Data

US 2009/0125586 A1    May 14, 2009

(30) Foreign Application Priority Data

Nov. 14, 2007   (JP) .................................. 2007-296033

(51) Int. Cl.
*G06F 15/16* (2006.01)
(52) U.S. Cl. ......... 709/205; 709/203; 709/204; 709/227
(58) Field of Classification Search .................. 709/203, 709/204, 205, 212, 214, 227, 246, 247
See application file for complete search history.

(56) References Cited

U.S. PATENT DOCUMENTS

| | | | |
|---|---|---|---|
| 5,726,669 A | 3/1998 | Obata et al. ........................ 345/2 |
| 6,191,807 B1 | 2/2001 | Hamada et al. ............. 348/14.07 |
| 7,237,002 B1* | 6/2007 | Estrada et al. ................ 709/203 |
| 2004/0017333 A1 | 1/2004 | Cooper et al. ................. 345/3.1 |
| 2006/0053195 A1* | 3/2006 | Schneider et al. ............ 709/204 |
| 2006/0053233 A1 | 3/2006 | Lin et al. ....................... 709/247 |
| 2006/0053380 A1* | 3/2006 | Spataro et al. ................ 715/753 |
| 2006/0136828 A1 | 6/2006 | Asano ........................... 715/733 |
| 2006/0184614 A1* | 8/2006 | Baratto et al. ................. 709/203 |
| 2007/0185959 A1* | 8/2007 | Huck et al. .................... 709/204 |
| 2007/0288640 A1* | 12/2007 | Schmieder .................... 709/227 |
| 2008/0301228 A1* | 12/2008 | Flavin ........................... 709/204 |

FOREIGN PATENT DOCUMENTS

| | | |
|---|---|---|
| DE | 10217818 | 11/2002 |
| EP | 0665670 A2 | 8/1995 |
| JP | 3715661 | 11/2005 |
| JP | 2006-172193 | 6/2006 |

OTHER PUBLICATIONS

Extended European Search Report dated Mar. 29, 2010 in EP 08018839.4.
"Vivanco PC Performance—USB Link Cable User's Guide", Jan. 1, 2007, Vivanco GmbH, Ahrensburg, Germany, XP-002573475, six sheets, including pp. 8-11.
Apple Remote Desktop 3; http://www.apple.com/remotedesktop/; Apple Inc., Cupertino, California; retrieved on Sep. 18, 2008.

* cited by examiner

*Primary Examiner* — Barbara N Burgess
(74) *Attorney, Agent, or Firm* — Fitzpatrick, Cella, Harper & Scinto

(57) ABSTRACT

The client's screen includes a shared area that displays a portion of the server's screen information. The present invention performs a remote event from the client upon the server by causing an input event that is instigated upon the shared area thereof to be replayed upon the server. When this circumstance occurs, the client detects the instruction for the transfer of data to the shared area thereof, requests the transfer of data from the server, receives the data that is thereby transferred from the server, and develops the data thus received to the client's memory space. Upon receipt of the request for transfer of data from the client, the server converts the data that is stored within the server's own memory space into a state wherein the data thus stored is capable of being transferred, and transmits the data thus converted to the client.

6 Claims, 9 Drawing Sheets

FIG. 6

OPERATION SCREEN MANAGEMENT TABLE

| | TERMINAL DEVICE ID | x | y | width | height |
|---|---|---|---|---|---|
| FRONTMOST SCREEN ↕ REARMOST SCREEN | 1(SERVER INFORMATION PROCESSING TERMINAL 102) | 100 | 250 | 300 | 200 |
| | 2(SERVER INFORMATION PROCESSING TERMINAL 103) | 500 | 250 | 300 | 200 |
| | 0(CLIENT INFORMATION PROCESSING APPARATUS 101) | 300 | 50 | 300 | 200 |

SCREEN SHARING SYSTEM AND DATA TRANSFER METHOD

BACKGROUND OF THE INVENTION

1. Field of the Invention

The present invention relates to a screen sharing system and a data transfer method that shares a screen among a plurality of information processing apparatuses.

2. Description of the Related Art

A screen sharing system, which shares a screen among a plurality of information processing apparatuses, has been used in recent times in a wide range of applications. The screen sharing system has been used in a circumstance such as the following:

- when remotely controlling an information processing apparatus that is located in a remote location; and
- at a conference, when displaying a screen that is present upon an information processing apparatus, such as a laptop computer that has been brought to a conference room, via a network, upon a large screen display that is installed in the conference room.

In addition to the screen sharing among the plurality of information processing apparatuses, a circumstance also arises wherein a user transfers a file between a memory space of different information processing apparatuses, by performing an operation upon a shared screen that is present upon a client information processing apparatus. Refer to Japanese Patent No. 3,715,661, Japanese Patent Application Laid Open No. 2006-172193, and the Apple Remote Desktop 3 software package from Apple, Inc., for instances of such a circumstance. In the present circumstance, the term "shared screen" refers to a screen whereupon a screen of a different information processing apparatus is displayed virtually, by way of a screen sharing function. As an instance thereof, a display screen that is present upon a server information processing apparatus is displayed upon the shared screen that is present upon the client information processing apparatus, by way of the screen sharing function.

A problem exists, however, with the screen sharing system described herein, in that it is possible to perform a data transfer only upon a file by way of the operation upon the shared screen.

As a consequence of the problem described herein, the user is incapable of such a usage by way of the operation upon the shared screen of transferring an image data that is displayed within an application to a memory space of an information processing apparatus that differs from an information processing apparatus whereupon the application that displays the image is running, as an instance.

SUMMARY OF THE INVENTION

The present invention has as an objective to allow a transfer of a data between a memory space of different information processing apparatuses, by having a user control a shared area of a screen sharing system.

According to one aspect of the present invention, there is provided a screen sharing system, configured to connect a client apparatus and a server apparatus via a network, and to perform a remote operation upon the server apparatus from the client apparatus, wherein the server apparatus transfers, at a minimum, a portion of a screen information thereof to the client apparatus, whereupon the client apparatus displays the screen information thus transferred thereto upon a screen thereof as a shared area therebetween, and transfers an input event information that is instigated with respect to the shared area therebetween to the server apparatus, whereupon the server apparatus replays the input even thus transferred thereto, wherein the client apparatus comprises:
a detection unit configured to detect an instruction for a transfer of a data from the shared area therebetween;
a request unit configured to request a transfer of a data from the server apparatus;
a reception unit configured to receive the data that is thus transferred thereto from the server apparatus; and
a development unit configured to develop the data that is received by the reception unit, to a memory space of the client apparatus; and the server apparatus comprises:
a conversion unit configured to receive a request for a transfer of a data from the client apparatus, and to convert a data that is in a memory space of the server apparatus to a state that allows a transfer of the data therein; and
a transmission unit configured to transmit the data that is converted with the conversion unit to the client apparatus.

According to another aspect of the present invention, there is provided a screen sharing system, configured to connect a client apparatus and a server apparatus via a network, and to perform a remote operation upon the server apparatus from the client apparatus, wherein the server apparatus transfers, at a minimum, a portion of a screen information thereof to the client apparatus, whereupon the client apparatus displays the screen information thus transferred thereto upon a screen thereof as a shared area therebetween, and transfers an input event information that is instigated with respect to the shared area therebetween to the server apparatus, whereupon the server apparatus replays the input even thus transferred thereto, wherein the client apparatus comprises:
a detection unit configured to detect an instruction for a transfer of a data from the shared area therebetween;
a conversion unit configured to convert a data that is in a memory space of the client apparatus to a state that allows a transfer of the data therein; and
a transmission unit configured to transmit the data that is converted with the conversion unit to the server apparatus; and the server apparatus comprises:
a reception unit configured to receive the data that is thus transferred thereto from the client apparatus; and
a development unit configured to develop the data that is received by the reception unit, to a memory space of the server apparatus.

According to still another aspect of the present invention, there is provided a screen sharing system, configured to connect a client apparatus and a server apparatus via a network, and to perform a remote operation upon the server apparatus from the client apparatus, wherein the server apparatus transfers, at a minimum, a portion of a screen information thereof to the client apparatus, whereupon the client apparatus displays the screen information thus transferred thereto upon a screen thereof as a shared area therebetween, and transfers an input event information that is instigated with respect to the shared area therebetween to the server apparatus, whereupon the server apparatus replays the input even thus transferred thereto, wherein the client apparatus comprises:
a detection unit configured to detect an instruction for a transfer of a data from a shared area of a screen of a server apparatus that the client apparatus displays to a different shared area of a screen of a different server apparatus that the client apparatus displays; and a request unit configured to request a transfer of a data from the server apparatus to the different server apparatus;

the server apparatus comprises:

a conversion unit configured to receive a request for a transfer of a data from the client apparatus, and to convert a data that is in a memory space of the server apparatus to a state that allows a transfer of the data therein; and a transmission unit configured to transmit the data that is converted with the conversion unit to the different server apparatus; and the different server apparatus comprises:

a reception unit configured to receive the data that is thus transferred thereto from the server apparatus; and a development unit configured to develop the data that is received by the reception unit, to a memory space of the different server apparatus.

According to yet another aspect of the present invention, there is provided a data transfer method of a screen sharing system, configured to connect a client apparatus and a server apparatus via a network, and to perform a remote operation upon the server apparatus from the client apparatus, wherein the server apparatus transfers, at a minimum, a portion of a screen information thereof to the client apparatus, whereupon the client apparatus displays the screen information thus transferred thereto upon a screen thereof as a shared area therebetween, and transfers an input event information that is instigated with respect to the shared area therebetween to the server apparatus, whereupon the server apparatus replays the input even thus transferred thereto, the data transfer method thereof comprising the steps of:

detecting an instruction for a transfer of a data from the shared area upon the client apparatus;

requesting a transfer of a data from the server apparatus;

receiving the data that is thus transferred thereto from the server apparatus;

developing the data that is received in the reception step to a memory space of the client apparatus;

receiving a request for a transfer of a data from the client apparatus, and converting a data that is in a memory space of the server apparatus to a state that allows a transfer of the data therein; and transmitting the data that is converted in the conversion step to the client apparatus.

According to still yet another aspect of the present invention, there is provided a data transfer method of a screen sharing system, configured to connect a client apparatus and a server apparatus via a network, and to perform a remote operation upon the server apparatus from the client apparatus, wherein the server apparatus transfers, at a minimum, a portion of a screen information thereof to the client apparatus, whereupon the client apparatus displays the screen information thus transferred thereto upon a screen thereof as a shared area therebetween, and transfers an input event information that is instigated with respect to the shared area therebetween to the server apparatus, whereupon the server apparatus replays the input even thus transferred thereto, the data transfer method thereof comprising the steps of:

detecting an instruction for a transfer of a data to the shared area upon the client apparatus;

converting a data that is in a memory space of the client apparatus to a state that allows a transfer of the data therein; and transmitting the data that is converted with the conversion unit to the server apparatus;

receiving the data that is thus transferred thereto from the client apparatus; and developing the data that is received by the reception unit, to a memory space of the server apparatus.

According to yet still another aspect of the present invention, there is provided a data transfer method of a screen sharing system, configured to connect a client apparatus and a server apparatus via a network, and to perform a remote operation upon the server apparatus from the client apparatus, wherein the server apparatus transfers, at a minimum, a portion of a screen information thereof to the client apparatus, whereupon the client apparatus displays the screen information thus transferred thereto upon a screen thereof as a shared area therebetween, and transfers an input event information that is instigated with respect to the shared area therebetween to the server apparatus, whereupon the server apparatus replays the input even thus transferred thereto, the data transfer method thereof comprising the steps of:

detecting an instruction for a transfer of a data, upon the client apparatus, from a shared area of a screen of the server apparatus that the client apparatus displays to a different shared area of a screen of a different server apparatus that the client apparatus displays;

requesting a transfer of a data from the server apparatus to the different server apparatus;

receiving a request for a transfer of a data from the client apparatus, and converting a data that is in a memory space of the server apparatus to a state that allows a transfer of the data therein;

transmitting the data that is converted in the conversion step to the different server apparatus;

receiving the data that is thus transferred thereto from the server apparatus; and developing the data that is received in the reception step, to a memory space of the different server apparatus.

Further features of the present invention will become apparent from the following description of exemplary embodiments (with reference to the attached drawings).

BRIEF DESCRIPTION OF THE DRAWINGS

FIG. 6 depicts an operation screen management table, which a screen sharing application program 222 manages.

DESCRIPTION OF THE EMBODIMENTS

Hereinafter follows a detailed description of preferred embodiments for carrying out the present invention, with reference to the attached drawings.

Figure 1:
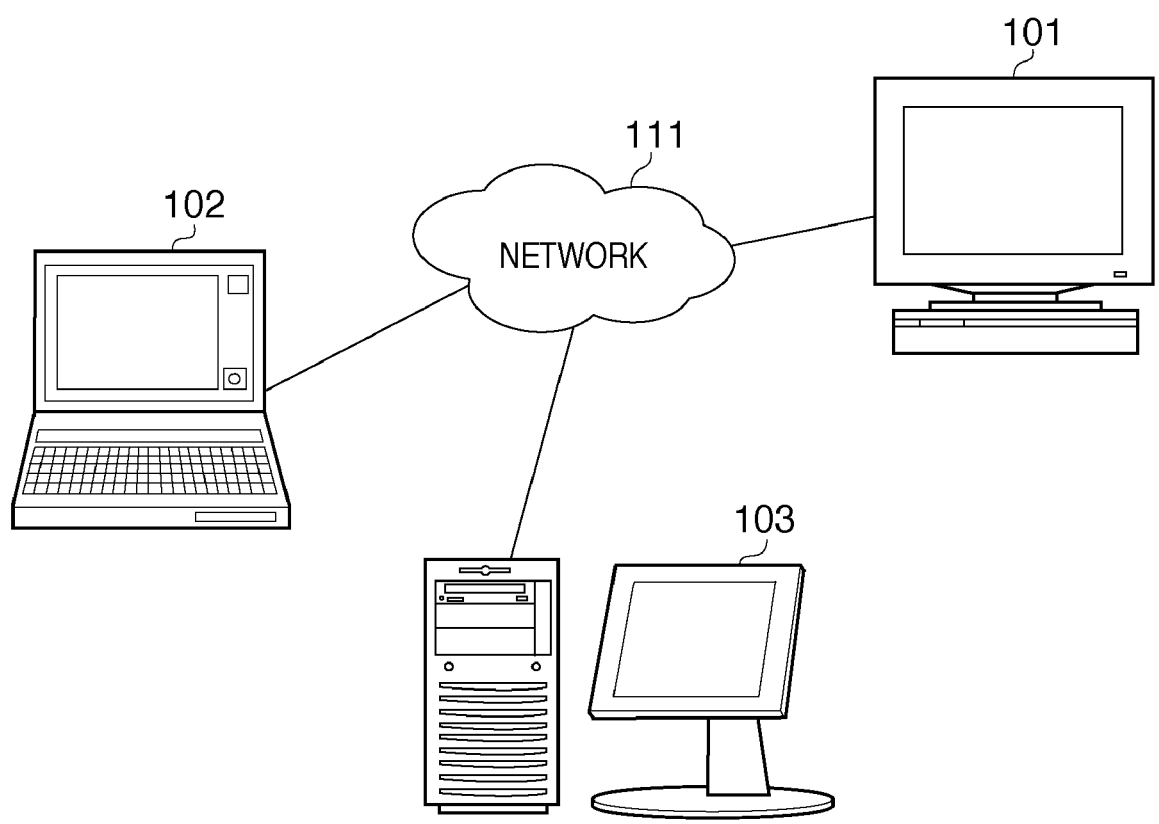
FIG. 1 depicts a network configuration of a screen sharing system according to an embodiment.

FIG. 1 depicts a network configuration of a screen sharing system according to an embodiment. The screen sharing system, such as is depicted in FIG. 1, connects a client information processing apparatus 101, a server information processing apparatus 102, and a server information processing apparatus 103, each whereof respectively comprising a communications function, to a network 111.

Figure 2:
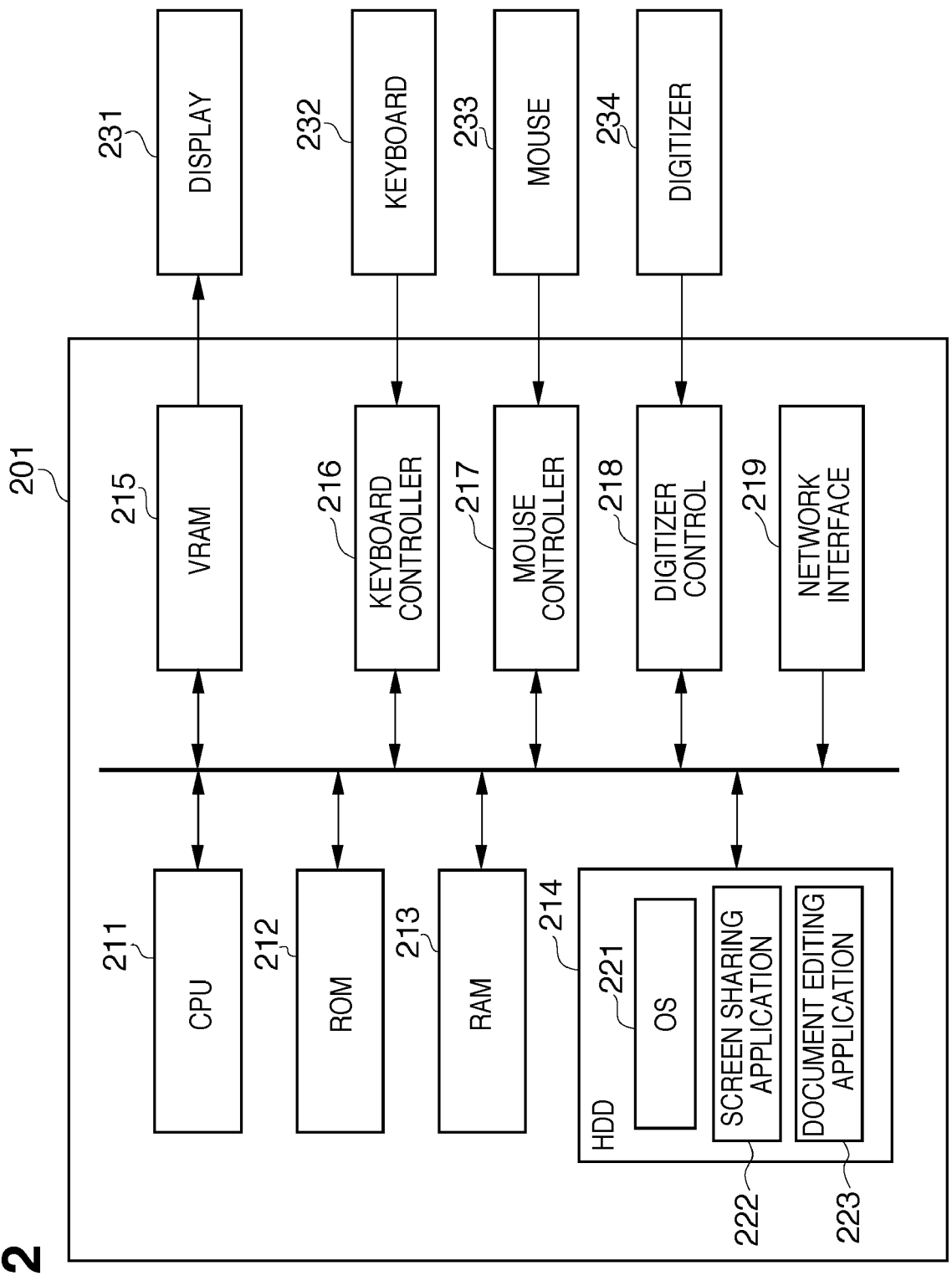
FIG. 2 is a conceptual diagram that depicts a hardware configuration of a client information processing apparatus and a server information processing apparatus that configures the screen sharing system according to the embodiment.

FIG. 2 is a conceptual diagram that depicts a hardware configuration of the client information processing apparatus and the server information processing apparatus that configures the screen sharing system according to the embodiment. It is to be understood that the client information processing apparatus and the server information processing apparatus is implemented by a computer system, such as a personal computer, and is accordingly described in FIG. 2 as an information processing apparatus 201.

The information processing apparatus 201 comprises a CPU 211, which directs a control of the apparatus overall, a ROM 212, which stores such as a boot program or a fixed, unchanging data, and a RAM 213, which functions as a main memory of the apparatus overall and provides a work space for the CPU 211. The information processing apparatus 201 further comprises a configuration as follows:

A hard disk drive 214 stores such as an operating system (OS) 221, a screen sharing application program 222, and a document editing application program 223. A VRAM 215 is a memory that develops such as an image data that is to be displayed upon a display 231, which is an instance of a display device whereupon such as the image data is displayed by the development thereupon by the VRAM 215.

A keyboard 232, a mouse 233, and a digitizer 234, as an input device, is respectively connected to a keyboard controller 216, a mouse controller 217, and a digitizer controller 218. An input therefrom is detected upon the CPU 211 as an interrupt signal. In addition, a network interface 219, which is capable of connecting to the network 111, is also installed upon the information processing apparatus 201.

With respect to the configuration described herein, the screen sharing application program 222 and the document editing application program 223 is activated in response to a specified instruction event from the keyboard 232, the mouse 233, and/or the digitizer 234. Upon the activation thereof, the screen sharing application program 222 and the document editing application program 223 is first loaded upon the RAM 213, and thereafter executed by the CPU 211.

It is to be understood that it would also be permissible for the screen sharing application program 222 that is described herein to be dependent upon, and to operate in tandem with, the operating system 221. In addition, the screen sharing application program 222 implements a screen sharing function (to be described hereinafter).

Figure 3:
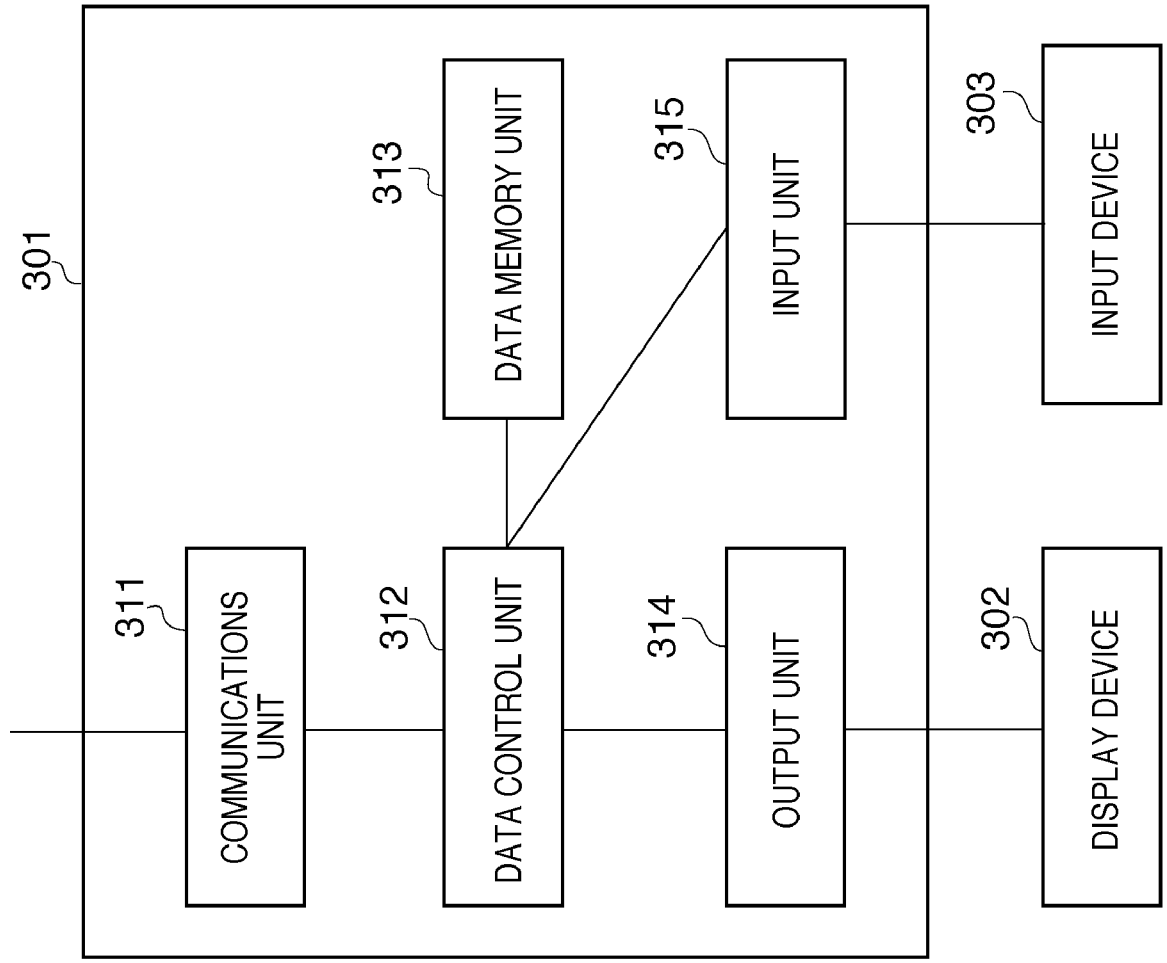
FIG. 3 is a conceptual diagram that depicts a function configuration of an information processing apparatus according to the embodiment.

FIG. 3 is a conceptual diagram that depicts a function configuration of the information processing apparatus according to the embodiment. In FIG. 3, reference numeral 301 corresponds to the information processing apparatus 201 that is depicted in FIG. 2. Reference numeral 302 is a display device that corresponds to the display 231 that is depicted in FIG. 2. Reference numeral 303 in an input device that corresponds to the keyboard 232, the mouse 233, and the digitizer 234, that is depicted in FIG. 2.

A communications unit 311, a data control unit 312, a data memory unit 313, an output unit 314, and an input unit 315 is incorporated into the information processing apparatus 301. The communications unit 311 connects to the network 111, and performs an information communication control process in order to send and receive data with such as another information processing apparatus. The data control unit 312 controls a process such as a screen sharing process or a data transfer process. The data memory unit 313 stores a data that is sent and received by way of such as the screen sharing process or the data transfer process.

The output unit 314 outputs a display screen image information to such as an LCD or a rear projection display. The input unit 315 receives an information that is detected by the input device 303, and transmits the information thus received to the data control unit 312.

Following is a description with respect to the data transfer by way of the screen sharing system, with reference to FIG. 4 to FIG. 9. The description commences with the data transfer with respect to the client information processing apparatus 101, with reference to FIG. 4. The description will treat a data transfer by way of a drag operation (drag and drop) with respect to a shared screen of the client information processing apparatus 101 and a local screen thereof as an instance thereof.

In the present circumstance, the local screen displays a local environment without using the screen sharing function. In addition, it is to be understood that a circumstance is also included herein whereby the data transfer is performed by a copy instruction or a transfer instruction upon the shared screen by way of a clipboard. A circumstance such as the following is an instance of the copy instruction or the transfer instruction upon the shared screen: a circumstance such as selecting such as an object that is included within a file or an application and using a menu that is displayed thereby to issue the instruction, or a circumstance such as issuing the instruction by double clicking upon such as an object that is included within a file or an application.

Figure 4:
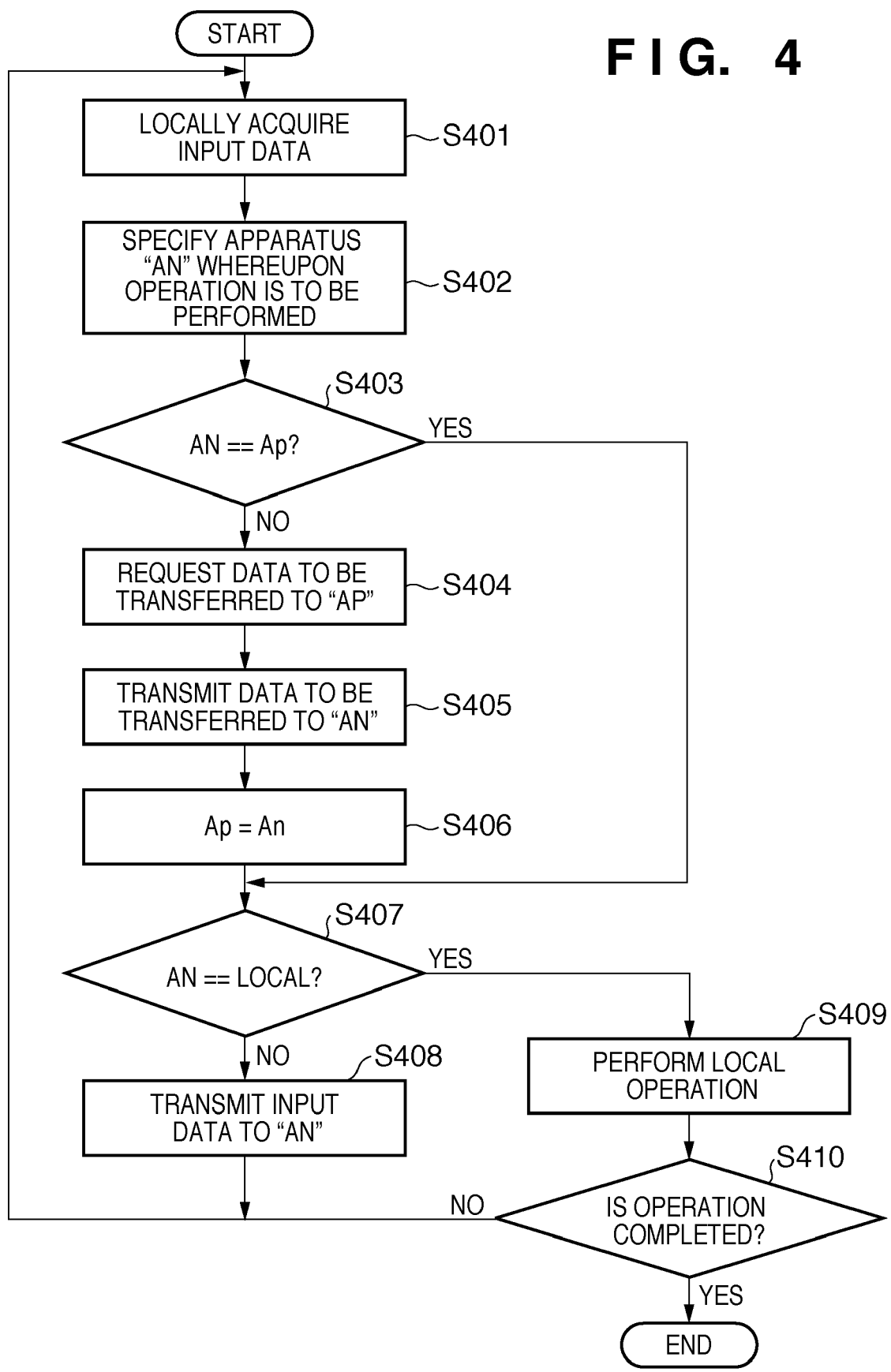
FIG. 4 is a flowchart that depicts a data transfer process upon a client information processing apparatus 101.

FIG. 4 is a flowchart that depicts the data transfer process upon the client information processing apparatus 101. The screen sharing function commences with the server information processing apparatus 102 and 103 and the client information processing apparatus 101, wherein the client information processing apparatus 101 performs the screen sharing with the server information processing apparatus 102 and 103. An instance of a display of the client information processing apparatus 101 at the present time is depicted in FIG. 5.

Figure 5:
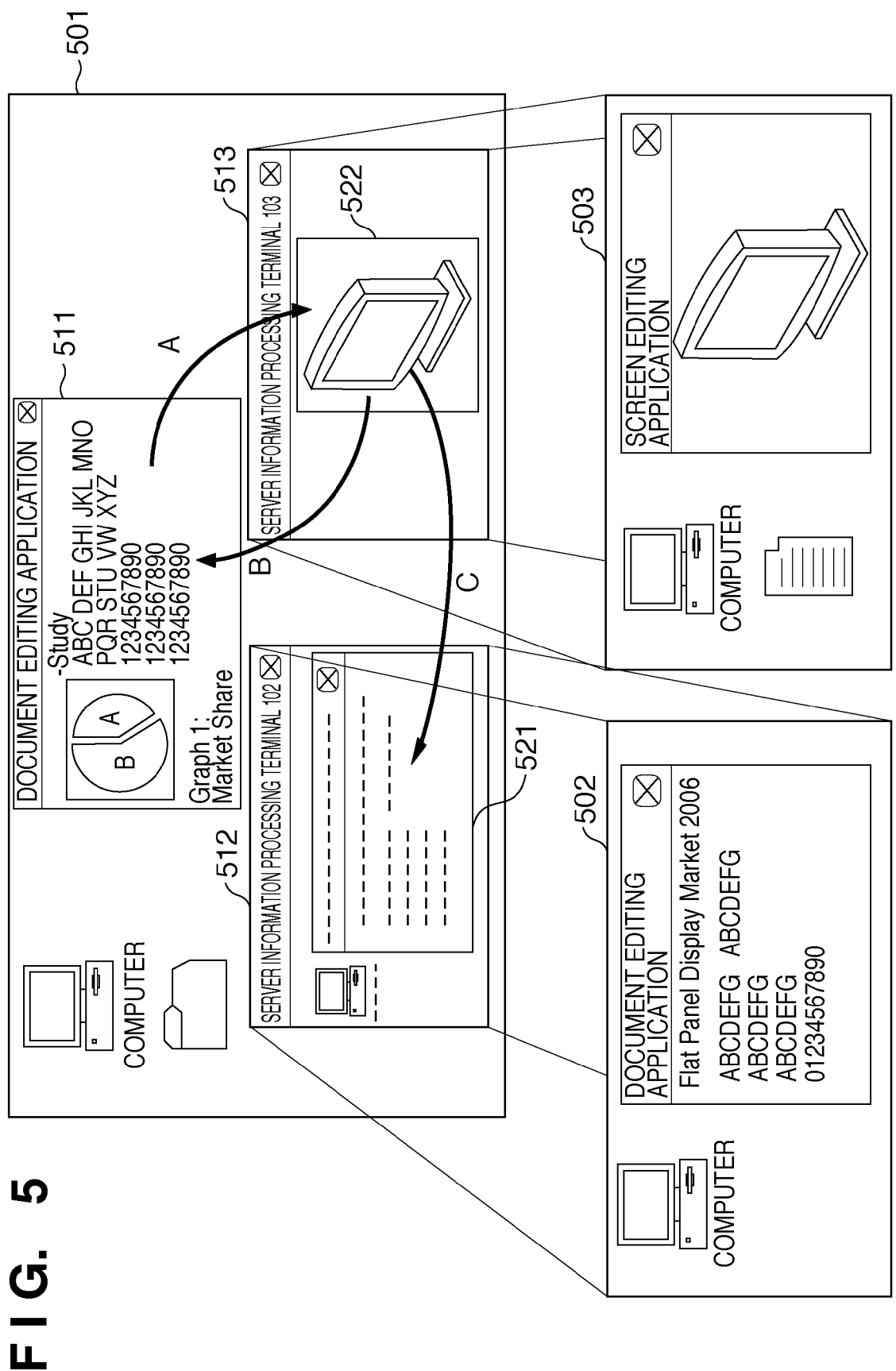
FIG. 5 depicts an instance of a display upon the client information processing apparatus 101 that is being screen shared by way of a screen sharing function.

In FIG. 5, reference numeral 501 is an instance of a display screen of the client information processing apparatus 101, reference numeral 502 is an instance of a display screen of the server information processing apparatus 102, and reference numeral 503 is an instance of a display screen of the server information processing apparatus 103. In the present circumstance, when describing the instance of the display screen 501 of the client information processing apparatus 101, reference numeral 511 is a display instance of the document editing application program 223 that is activated upon the client information processing apparatus 101.

In addition, reference numeral 512 is a display instance of the screen sharing application program 222 that is activated upon the client information processing apparatus 101, i.e., a display upon the client information processing apparatus 101, by way of the screen sharing function, of the display screen 502 of the server information processing apparatus 102.

Furthermore, reference numeral 513 is a display instance of the screen sharing application program 222 that is activated upon the client information processing apparatus 101, i.e., a display upon the client information processing apparatus 101, by way of the screen sharing function, of the display screen 503 of the server information processing apparatus 103.

Thereafter, in step S401, the data control unit 312 of the client information processing apparatus 101 acquires a coordinate information that is inputted by way of the input unit 315 from the input device 303 of such as the mouse 233 or the digitizer 234, and stores the coordinate information thus acquired in the data memory unit 313. Thereafter, in step S402, the data control unit 312 of the client information processing apparatus 101 determines an information processing apparatus "An" upon which an operation is to be performed, based on the coordinate information that has been stored in the data memory unit 313. It is to be understood that "An" represents an information processing apparatus of a present circumstance herein.

FIG. 6 depicts an operation screen management table, which the screen sharing application program 222 manages. The operation screen management table is stored in the data memory unit 313.

In step S402, a determination is made of an information processing apparatus upon which an operation is to be performed from the operation screen management table, based on the coordinate information that has been stored in the data memory unit 313 in step S401. In such a circumstance, the data control unit 312 of the client information processing apparatus 101 determines for a region that is not included within the operation screen management table that "the information processing apparatus upon which the operation is to be performed is the client information processing apparatus 101."

Thereafter, in step S403, the data control unit 312 of the client information processing apparatus 101 determines whether or not the information processing apparatus "An," which is determined in step S402 to be the information processing apparatus upon which the operation is to be performed, is the same as an information processing apparatus "Ap," whereof a flag that denotes an apparatus upon which an operation is to be performed is set. It is to be understood that "Ap" represents the flag that denotes the apparatus upon which the operation is to be performed. The "Ap" flag that denotes the apparatus upon which the operation is to be performed is set in step S406 (to be described hereinafter), and is stored in the data memory unit 313.

If and only if a result of the determination that is performed in step S403 shows that the information processing apparatus "An" and the information processing apparatus "Ap" are the same, the process proceeds to step S407. If the result of the determination that is performed in step S403 shows that the information processing apparatus "An" and the information processing apparatus "Ap" are not the same, the process proceeds to step S404. In step S404, the data control unit 312 of the client information processing apparatus 101 requests a data to be transferred to the information processing apparatus that is set and stored in the data memory unit 313 as the information processing apparatus "Ap" thereupon, whereof the flag that denotes the apparatus upon which the operation is to be performed is set.

In the present circumstance, the "data to be transferred" literally means just that: the data that is to be transferred. In addition, the data to be transferred includes such as an image data, a moving picture data, a text data, or an object data, which is included within a data file or an arbitrary application program.

If the information processing apparatus "Ap," whereof the flag that denotes the apparatus upon which the operation is to be performed is set, which is determined in step S404, as described herein, is a local apparatus, the data control unit 312 of the client information processing apparatus 101 acquires the data to be transferred that is stored in the data memory unit 313.

Thereafter, in step S405, the data control unit 312 of the client information processing apparatus 101 transmits the data to be transferred to the information processing apparatus "An" upon which the operation is to be performed. If the information processing apparatus "An" upon which the operation is to be performed is a local apparatus in step S405, then the data control unit 312 of the client information processing apparatus 101 develops the data that is acquired thereby in step S404, and stores the data thus developed in the data memory unit 313 as the data to be transferred.

The data to be transferred is thus passed from a memory space of the information processing apparatus "An" to a memory space of the information processing apparatus "Ap," whereof the flag that denotes the apparatus upon which the operation is to be performed is set, by way of the step S404 and S405 that is described herein.

Thereafter, in step S406, the data control unit 312 of the client information processing apparatus 101 sets the information processing apparatus "An" upon which the operation is to be performed to the information processing apparatus "Ap," whereof the flag that denotes the apparatus upon which the operation is to be performed is set, and stores a result thereof in the data memory unit 313.

Thereafter, in step S407, the data control unit 312 of the client information processing apparatus 101 determines whether or not the information processing apparatus "An" upon which the operation is to be performed, and which has been stored in the data memory unit 313 in step S406, is local, which, in the present circumstance, is equivalent to determining whether or not the information processing apparatus "An" upon which the operation is to be performed, and which has been stored in the data memory unit 313 in step S406, is the client information processing apparatus 101. If it is determined herein that the information processing apparatus "An" upon which the operation is to be performed is local, the process proceeds to step S409, whereas if it is determined herein that the information processing apparatus "An" upon which the operation is to be performed is not local, the process proceeds to step S408.

In step S408, the data control unit 312 of the client information processing apparatus 101 transmits the input information that was stored in the data memory unit 313 in step S401 to the information processing apparatus "An" upon which the operation is to be performed, and returns to step S401 thereafter.

In step S409, on the other hand, the data control unit 312 of the client information processing apparatus 101 continues the local operation. Thereafter, in step S410, the data control unit 312 of the client information processing apparatus 101 determines whether or not the user has completed the operation. In the present circumstance, the process terminates if the operation has been completed. On the other hand, the process returns to step S401 if the operation has not been completed.

It is to be understood that when the user performs a drag operation or a copy operation after requesting and transmitting the data to be transferred in step S404 and step S405, the data to be transferred is passed to such as an application or a file system whereupon the operation is to be performed. Put another way, when the user performs the drag operation or the copy operation upon the display screen of the screen sharing application 222, the data to be transferred is passed to such as an arbitrary application or an arbitrary file system that is running upon the server information processing apparatus. In the present circumstance, the display screen displays the display screen of the server information processing apparatus upon the client information processing apparatus, by way of the screen sharing function.

A data transfer "A," "B," and "C" that is depicted in FIG. 5 is implemented by way of the process described herein. In the present circumstance, "A," "B," and "C" denote a data transfer as follows:

"A": a data transfer from the memory space of the client information processing apparatus 101 to the memory space of the server information processing apparatus 103;

"B": a data transfer from the memory space of the server information processing apparatus 103 to the memory space of the client information processing apparatus 101; and "C": a data transfer from the memory space of the server information processing apparatus 103 to the memory space of the server information processing apparatus 102.

Whereas the data transfer "B" is described as a concrete instance according to the embodiment, it is to be understood that it would be possible to substitute the information processing apparatus "An" upon which the operation is to be performed and the information processing apparatus "Ap," whereof the flag of the apparatus upon which the operation is to be performed is set, with an information processing apparatus that corresponds to the data transfer "A" or the data transfer "C" as well.

Figure 7:
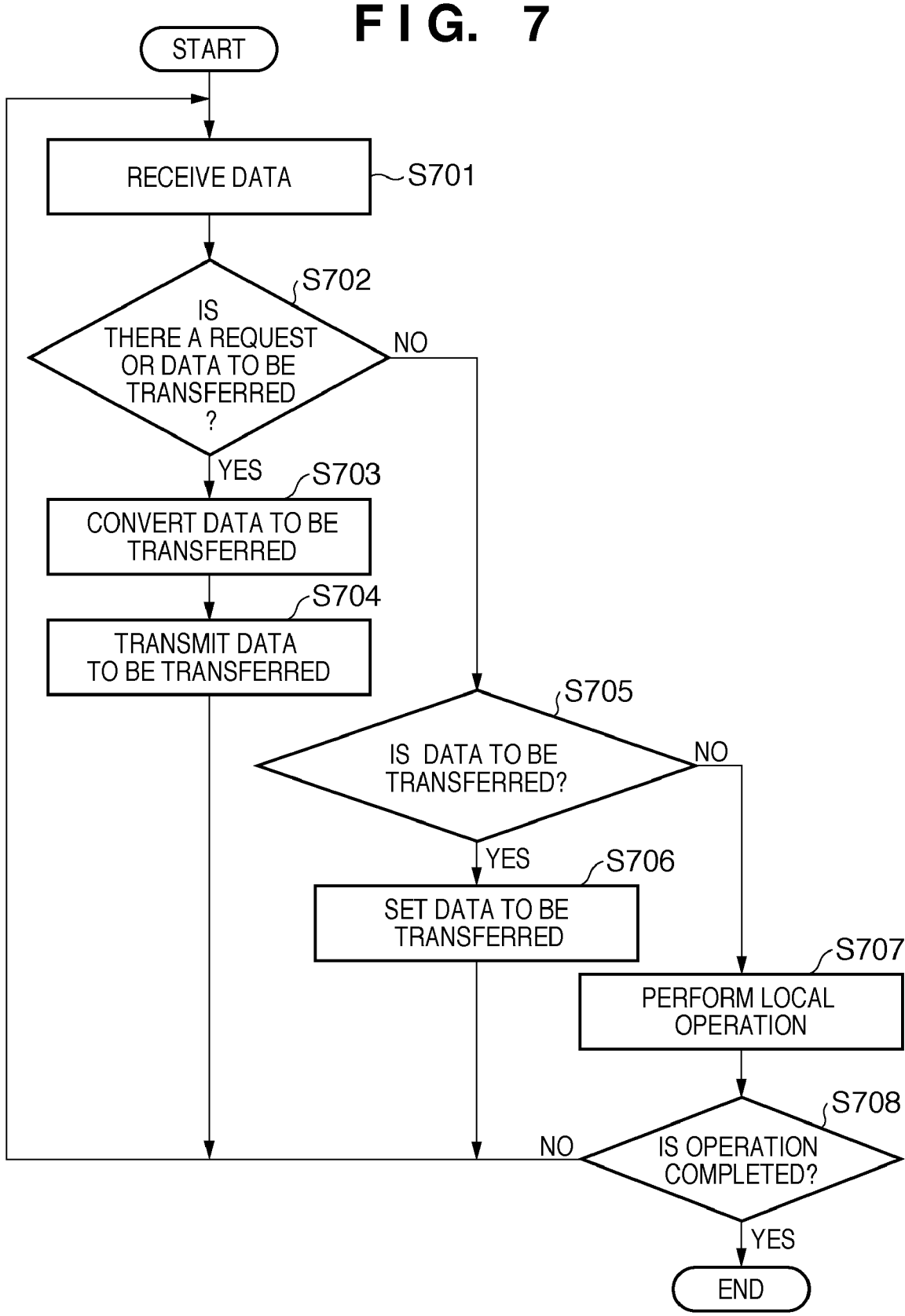
FIG. 7 is a flowchart that depicts a data transfer process upon a server information processing apparatus 102 and 103.
Figure 8:
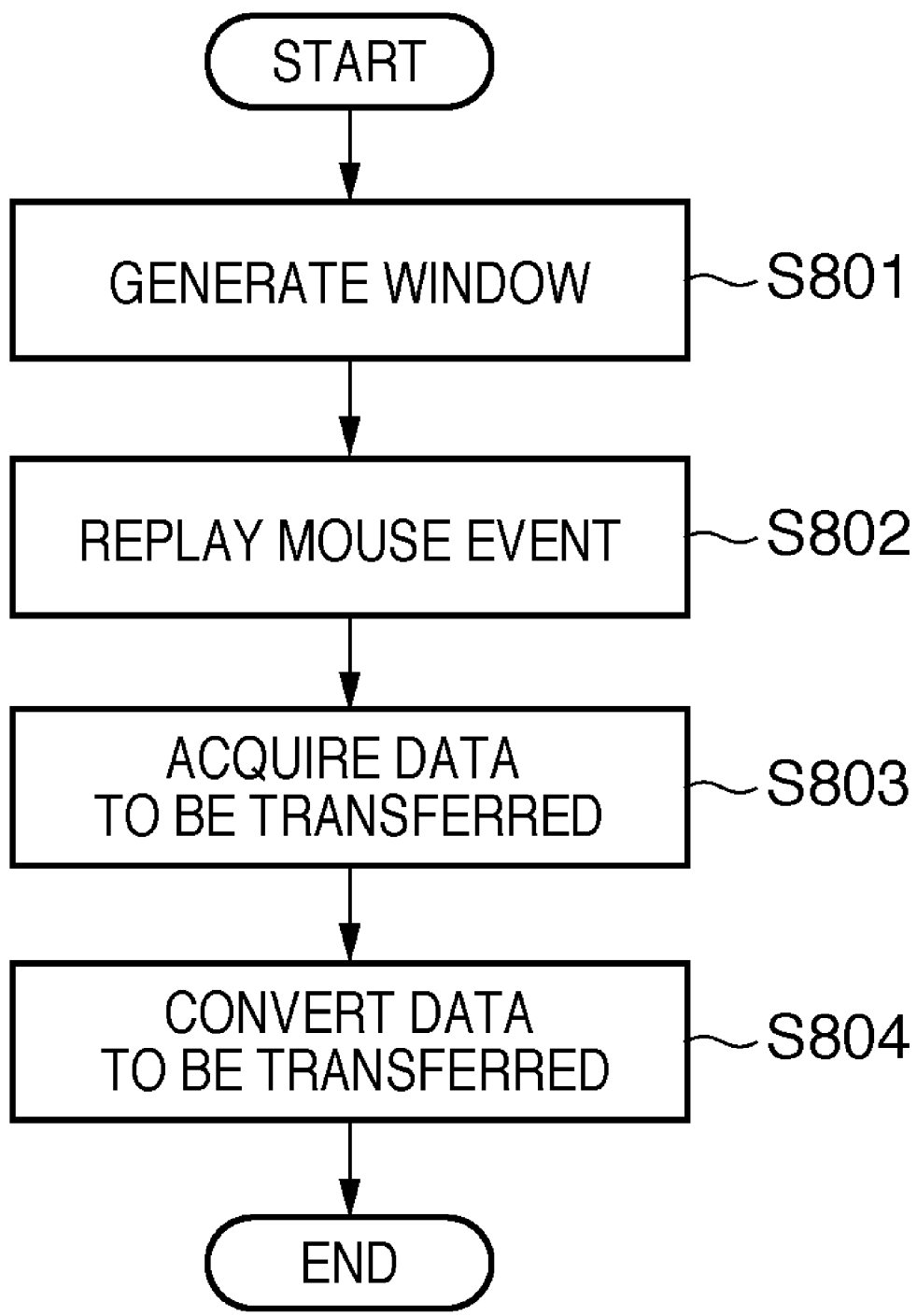
FIG. 8 is a flowchart that depicts a process of converting a data to be transferred that is depicted in step S703 of FIG. 7 in detail.

Following is a description of a data transfer with respect to the server information processing apparatus 102 and 103, with reference to FIG. 7 and FIG. 8.

FIG. 7 is a flowchart that depicts a data transfer process upon the server information processing apparatus 102 and 103. The process commences with step S701, wherein the data control unit 312 of the server information processing apparatus 102 and 103 receives the data that is transmitted from the client information processing apparatus 101, and stores the data thus received upon the data memory unit 313 thereof. The process of receiving the data thereupon corresponds to the process of the data transmission to the server information processing apparatus 102 and 103 that the client information processing apparatus 101 performs according to step S404, step S405, and step S408, as depicted in FIG. 4.

Thereafter, in step S702, the data control unit 312 of the server information processing apparatus 102 and 103 analyzes the data that is received in step S701, and determines whether or not the data to be transferred is being requested. If, as a result thereof, it is determined that the data to be transferred is being requested, the process proceeds to step S703, whereas if it is determined that the data to be transferred is not being requested, the process proceeds to step S705.

In step S703, the data control unit 312 of the server information processing apparatus 102 and 103 employs a process of acquisition of the data to be transferred to convert the data to be transferred into a state wherein the data to be transferred is capable of being transferred. The process thereof is further described hereinafter, with reference to FIG. 8.

Thereafter, in step S704, the data control unit 312 of the server information processing apparatus 102 and 103 transmits the data to be transferred that has been converted in step S703 to the requested destination of the transfer, and returns to step S701 thereafter.

In step S705, on the other hand, the data control unit 312 of the server information processing apparatus 102 and 103 determines whether or not the data that is stored in the data memory unit 313 in step S701 is the data to be transferred. If, as a result thereof, it is determined that the data that is stored in the data memory unit 313 is the data to be transferred, the process proceeds to step S706, whereas if it is determined that the data that is stored in the data memory unit 313 is not the data to be transferred, the process proceeds to step S707.

In step S706, the data control unit 312 of the server information processing apparatus 102 and 103 develops the data that is stored in the data memory unit 313 in step S701, stores the data thus developed in the data memory unit 313 as the data to be transferred, and returns to step S701 thereafter.

In step S707, on the other hand, the data control unit 312 of the server information processing apparatus 102 and 103 employs the data that is stored in the data memory unit 313 in step S701 to perform an operation locally, i.e., upon the server information processing apparatus. As an instance thereof, a local mouse cursor would be moved in accordance with the data that is stored in the data memory unit 313 in step S701.

Thereafter, in step S708, the data control unit 312 of the server information processing apparatus 102 and 103 determines whether or not the user has completed the operation. In the present circumstance, the process terminates if the operation has been completed. On the other hand, the process returns to step S701 if the operation has not been completed.

It is to be understood that it would be permissible for the network configuration of the screen sharing system according to the embodiment to be a configuration such as the following, in addition to a configuration such as is described herein:

a plurality of the server information processing apparatus and a single client information processing apparatus;

a single server information processing apparatus and a single client information processing apparatus;

a single server information processing apparatus and a plurality of the client information processing apparatus; and a plurality of the server information processing apparatus and a plurality of the client information processing apparatus.

Following is a description of the process of acquisition of the data to be transferred that is depicted in step S703 of FIG. 7, with reference to FIG. 8. In the present circumstance, an instance of a data transfer from the server information processing apparatus 103 to the client information processing apparatus 101, such as is depicted in "B" in FIG. 9, will be cited with respect to the description hereinafter.

Figure 9:
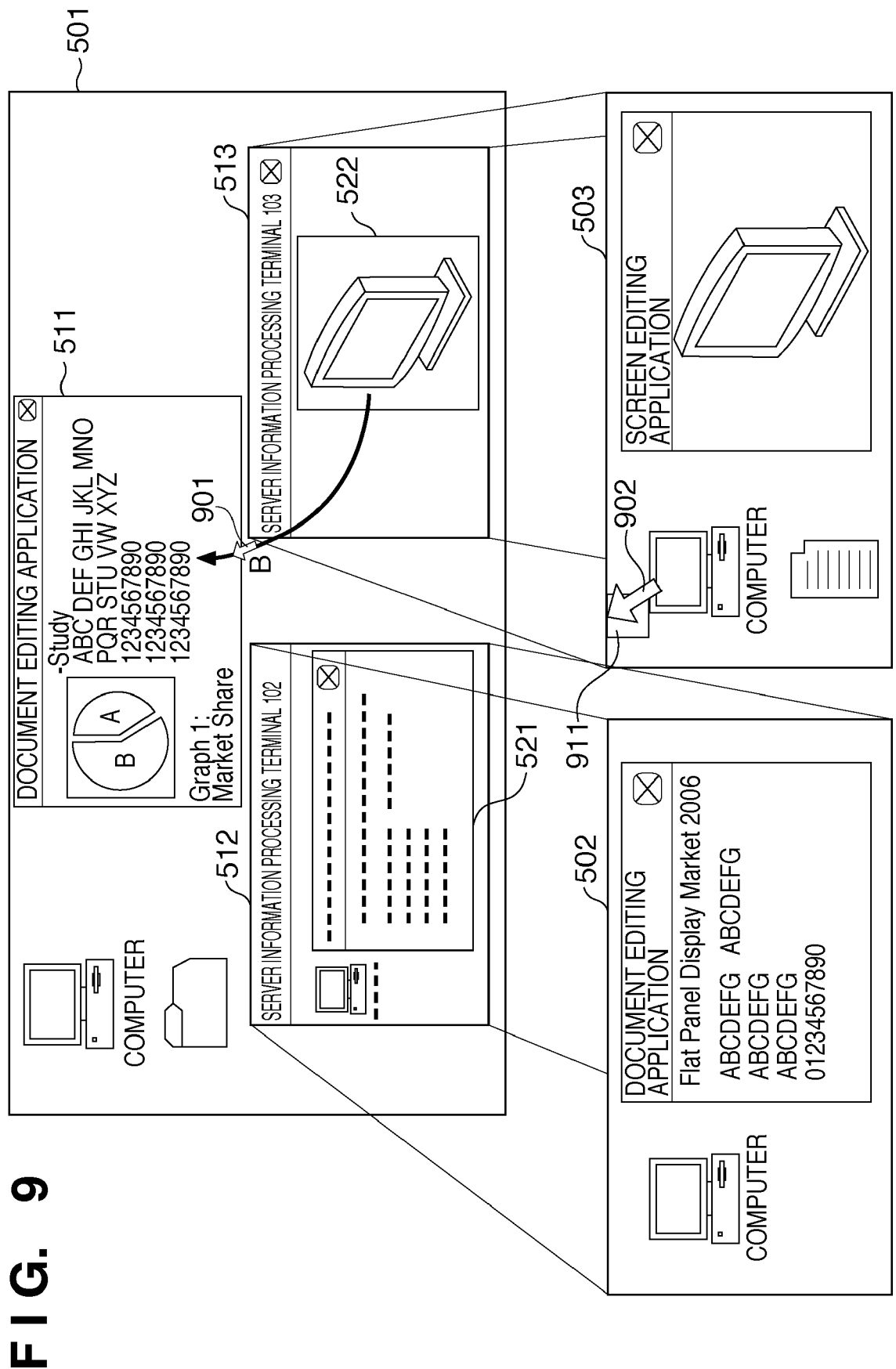
FIG. 9 depicts a screen display example upon the client information processing apparatus 101 and the server information processing apparatus 102 and 103.

FIG. 8 is a flowchart that depicts the process of converting the data to be transferred that is depicted in step S703 of FIG. 7 in detail. FIG. 9 depicts a screen display example upon the client information processing apparatus 101 and the server information processing apparatus 102 and 103. Reference numeral 501 to 522 that is depicted in FIG. 9 is identical to reference numeral 501 to 522 that is depicted in FIG. 5.

In FIG. 9, reference numeral 901 is a cursor of the mouse 233 of the client information processing apparatus 101. In the present circumstance, the information processing apparatus that is set with the flag "Ap," whereof the apparatus upon which the operation is to be performed is set, is the server information processing apparatus 103, the information processing apparatus "An" upon which the operation is to be performed, which is determined by the data control unit 312 of the client information processing apparatus 101, is local, or put another way, the client information processing apparatus 101 proper. Reference numeral 902 is a cursor of the mouse 233 of the server information processing apparatus 103, which is present at a location that is depicted in FIG. 9.

The process commences with step S801, wherein the data control unit 312 of the server information processing apparatus 103 instigates a window 911 under the cursor 902 that is depicted in FIG. 9. Thereafter, in step S802, the data control unit 312 of the server information processing apparatus 103 instigates a mouse event. Thereafter, in step S803, the data control unit 312 of the server information processing apparatus 103 employs the window 911 to process the mouse event that was instigated thereby in step S802. The process described herein acquires the data to be transferred, which is stored upon the data memory unit 313 of the server information processing apparatus 103. Finally, in step S804, the data control unit 312 of the server information processing apparatus 103 converts the data to be transferred, which has been acquired in step S803, into a state wherein the data to be transferred is capable of being transferred, whereupon the process terminates.

A portion of the screen information of the server, at a minimum, is thus transferred via the network to the client, and the screen information thus transferred is thereby displayed upon the client screen, as a shared area thereof. An input event information that is instigated within the shared area upon the client is transferred thereupon to the server, and the input event information thus transferred is replayed upon the server as an input event information of the server.

It is possible thereby to transfer a data between a memory space of a given information processing apparatus and a memory space of a different information processing apparatus within a screen sharing system that performs a remote operation from a client to a server, by having a user operate a shared screen upon a client information processing apparatus thereof.

An image data, a moving picture data, a text data, and an object data has been treated herein as a data that is transferred between the memory space of the given information processing apparatus and the memory space of the different information processing apparatus according to the embodiment. It is to be understood, however, that the present invention is capable of dealing with a data of a type other than the data types described herein as well.

It is to be understood that it would be permissible to apply the present invention to a system that is configured from a plurality of devices, such as a host computer, an interface device, a reader, and printer, as an instance thereof, as well as to an apparatus that is configured from a single device, such as a copying machine or a fax machine, as an instance thereof.

In addition, it is to be understood that an objective of the present invention is also achieved by recording, upon a recording medium, a program code of a software that implements the function according to the implement as described herein, supplying the recording medium whereupon the program code thereof has been recorded to the system or the apparatus, and having a computer, either a CPU or an MPU, of the system or the apparatus load and execute the program code that is stored upon the recording medium thus supplied thereto.

In such a circumstance, the program code itself that is loaded from a computer-readable recording medium implements the function according to the embodiment as described herein, and thus, the recording medium whereupon the program code is stored configures the present invention.

It would be possible to employ such as a floppy disk, a hard drive, an optical disc, a magneto-optical (M/O) disk, a CD-ROM, CD-R, a magnetic tape, a nonvolatile memory card, or a ROM as the recording medium for supplying the program code, as an instance thereof.

It is to be understood that a circumstance that follows hereinafter is also included in implementing the function according to the embodiment, in addition to having the computer execute the program code that is loaded thereupon: a circumstance whereby an operating system (OS) or other software that is running upon the computer performs an actual processing, in whole or in part, in accordance with an instruction of the program code that is loaded thereupon, and the function according to the embodiment as described herein is implemented by the processing thereof.

It is to be further understood that a circumstance is also included in implementing the function according to the embodiment, wherein the program code that is loaded from the recording medium is written to a memory that is comprised within such as a function extension board that is inserted into the computer, or a function extension unit that is connected to the computer, and such as a CPU that is also comprised within such as the function extension board or the function extension unit performs the actual processing, in whole or in part, in accordance with the instruction of the program code that is loaded thereupon, and the function according to the embodiment as described herein is implemented by the processing thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-296033, filed Nov. 14, 2007, which is hereby incorporated by reference herein in its entirety.

What is claimed is:

1. A screen sharing system, configured to connect a client apparatus and a server apparatus via a network, and to perform a remote operation upon the server apparatus from the client apparatus, the screen sharing system comprising:

the client apparatus comprising:
a display unit to display a portion of screen information transferred to the client apparatus from the server apparatus, wherein the screen information is displayed upon a screen of the client apparatus as a shared area between the client apparatus an the server apparatus;
a transfer unit constructed to transfer an input event information that is instigated with respect to the shared area to the server apparatus, whereupon the server apparatus replays the input event information transferred to the server apparatus;
a determination unit constructed to determine whether or not an input event is instigated as an operation by a user of the client apparatus inside the shared area;
a detection unit constructed to detect whether or not the operation is a drag operation operated outside the shared area in a case where it is determined by the determination unit that the input event is instigated inside the shared area therebetween;
a request unit configured to request a transfer of a data from the server apparatus in case where it is detected by the detection unit that the operation is the drag operation operated outside the shared area;
a reception unit constructed to receive the data that is transferred thereto from the server apparatus; and
a development unit constructed to develop the data that is received by the reception unit, to a memory space of the client apparatus, and the server apparatus comprising:
a transfer unit constructed to transfer, at a minimum, the portion of the screen information to the client apparatus;
a conversion unit constructed to receive a request for a transfer of a data from the client apparatus, and to convert a data that is in a memory space of the server apparatus to a state that allows a transfer of the data therein; and
a transmission unit constructed to transmit the data that is converted with the conversion unit to the client apparatus, wherein a window is generated under a cursor upon the server apparatus, and thereafter, the data is acquired by an event being instigated, and the event thus instigated being processed within the window thus generated.

2. The screen sharing system according to claim 1, wherein upon receipt from the client apparatus of the request for the transfer of the data, the conversion unit instigates the event upon the server apparatus, and acquires the data that is within the memory space of the server apparatus by processing the event thus instigated thereupon.

3. A screen sharing system, configured to connect a client apparatus and a server apparatus via a network, and to perform a remote operation upon the server apparatus from the client apparatus, the screen sharing system comprising:
the client apparatus comprising:
a display unit constructed to display a portion of screen information transferred from the server apparatus to the client apparatus, wherein the screen information is displayed upon a screen of the client apparatus as a shared area between the client apparatus and the server apparatus;
a transfer unit constructed to transfer an input event information that is instigated with respect to the shared area to the server apparatus, whereupon the server apparatus replays the input event information transferred to the server apparatus;
a determination unit constructed to determine whether or not an input event is instigated as an operation by a user of the client apparatus outside the shared area;
a detection unit constructed to detect whether or not the operation is a drag operation operated inside the shared area in a case where it is determined by the determination unit that the input event is instigated outside the shared area;
a conversion unit constructed to convert a data that is in a memory space of the client apparatus to a state that allows a transfer of the data therein in a case where it is detected by the detection unit that the operation is the drag operation operated inside the shared area; and
a transmission unit constructed to transmit the data that is converted with the conversion unit to the server apparatus, and
the server apparatus comprising:
a transfer unit constructed to, at a minimum, transfer the portion of the screen information to the client apparatus;
a reception unit constructed to receive the data that is transferred thereto from the client apparatus; and
a development unit constructed to develop the data that is received by the reception unit, to a memory space of the server apparatus, wherein a window is generated under a cursor upon the server apparatus, and thereafter, the data is acquired by an event being instigated, and the event thus instigated being processed within the window thus generated.

4. A data transfer method of a screen sharing system, configured to connect a client apparatus and a server apparatus via a network, and to perform a remote operation upon the server apparatus from the client apparatus, the data transfer method comprising the steps of:
transferring to the client apparatus, at a minimum, a portion of a screen information of the server apparatus;
displaying the screen information transferred to the client apparatus from the server apparatus, wherein the screen information is displayed upon a screen of the client apparatus as a shared area between the client apparatus and the server apparatus;
transferring an input event information that is instigated with respect to the shared area to the server apparatus, whereupon the server apparatus replays the input event information transferred to the server apparatus;
determining whether or not an input event is instigated as an operation by a user of the client apparatus inside the shared area;
detecting whether or not the operation is a drag operation operated outside the shared area upon the client apparatus in a case where it is determined in the step of determining that the input event is instigated inside the shared area;
requesting a transfer of a data from the server apparatus in a case where it is detected in the step of detecting that the operation is the drag operation operated outside the shared area;
receiving the data that is thus transferred thereto from the server apparatus; developing the data that is received in the reception step to a memory space of the client apparatus;
receiving a request for a transfer of a data from the client apparatus, and converting data that is in a memory space of the server apparatus to a state that allows a transfer of the data therein; and
transmitting the data that is converted in the conversion step to the client apparatus, wherein a window is generated under a cursor upon the server apparatus, and thereafter, the data is acquired by an event being instigated, and the event thus instigated being processed within the window thus generated.

5. A data transfer method of a screen sharing system, configured to connect a client apparatus and a server apparatus via a network, and to perform a remote operation upon the server apparatus from the client apparatus, the data transfer method comprising the steps of:
transferring to the client apparatus, at a minimum, a portion of a screen information the server apparatus;
displaying the screen information transferred to the client apparatus from the server apparatus, wherein the screen information is displayed upon a screen of the client apparatus as a shared area between the client apparatus and the server apparatus;
transferring an input event information that is instigated with respect to the shared area to the server apparatus, whereupon the server apparatus replays the input event information transferred to the server apparatus;
determining whether or not an input event is instigated as an operation by a user of the client apparatus outside the shared area;
detecting whether or not the operation is a drag operation operated inside the shared area upon the client apparatus in a case where it is determined in the step of determining that the input event is instigated outside the shared area;
converting a data that is in a memory space of the client apparatus to a state that allows a transfer of the data therein in a case where it is detected in the step of detecting that the operation is the drag operation operated inside the shared area; and
transmitting the data that is converted with the conversion unit to the server apparatus;
receiving the data that is thus transferred thereto from the client apparatus; and
developing the data that is received by the reception unit, to a memory space of the server apparatus, wherein a window is generated under a cursor upon the server apparatus, and thereafter, the data is acquired b an event being instigated, and the event thus instigated being processed within the window thus generated.

6. A non-transitory computer-readable medium comprising a computer-executable program stored thereon, which when executed by a computer, causes the computer to perform the data transfer method according to claim 4.

* * * * *